United States Patent

[11] 3,609,370

[72] Inventor Leonard F. Peyser
Briarcliff Manor, N.Y.
[21] Appl. No. 887,602
[22] Filed Dec. 23, 1969
[45] Patented Sept. 28, 1971
[73] Assignee The Machlett Laboratories Incorporated, a wholly owned subsidiary of Ratheon Company
Springdale, Conn.

[54] RADIATION COLLIMATOR FOR USE IN X-RAY SYSTEMS
4 Claims, 8 Drawing Figs.

[52] U.S. Cl. .................................................. 250/105
[51] Int. Cl. .................................................. G03b 41/16, G21f 5/02, H01j 35/16
[50] Field of Search .................................................. 250/105

[56] References Cited
UNITED STATES PATENTS
2,894,144  7/1959  Barrett ........................  250/105
3,304,427  2/1967  Peyser ........................  250/105
3,448,270  6/1969  Peyser ........................  250/105

Primary Examiner—Anthony L. Birch
Attorneys—Harold A. Murphy and Joseph D. Pannone ABSTRACT: Collimating apparatus for regulating the cross-sectional size and shape of a beam of radiation which comprises a first shutter device adapted to be positioned adjacent the source of radiation and a pair of associated plane shutter devices cooperatively connected with the first shutter device whereby when either of the plane shutter devices is operated the first shutter will simultaneously be operated, the means by which the plane shutter devices are interconnected with the first shutter device being such that the cross-sectional size and shape of the beam passing through the collimator will be controlled by the plane shutter device, and the first shutter will intercept marginal radiation but will not intercept the primary to such an extent as will decrease the size of the beam regulated by the plane shutter devices.

FIG. 1

INVENTOR
LEONARD F. PEYSER
BY
AGENT

INVENTOR
LEONARD F. PEYSER

AGENT

INVENTOR
LEONARD F. PEYSER
BY
AGENT

RADIATION COLLIMATOR FOR USE IN X-RAY SYSTEMS

BACKGROUND OF THE INVENTION

X-ray systems, such as are used particularly for diagnosis and treatment of the human body, provide a beam of X-radiation which impinges upon the subject in a desired area to be treated or examined. It is desirable that the X-radiation be rigidly confined to the specific area and prevented from contacting other areas and possibly causing damage thereto by undesirable irradiation. Some undesirable radiation is known to be emitted by X-ray tubes from off-focal spots on the X-ray tube anode. Such off-focus radiation often passes through inefficient shutter devices and sometimes bypasses lead or other absorbent filters and eventually is enabled to reach the subject. The problem of preventing undesired off-focus or other radiation emitted by an X-ray tube anode from passing through a system to a subject is best prevented by disposing X-ray absorbing shutters as close as possible to the X-ray tube anode, and by closely regulating the cross-sectional dimension of the useful beam of X-radiation.

This problem has been effectively solved by the structure shown and described in U.S. Pat. No. 3,448,270 issued to the same assignee as the present invention. This referenced prior art is directed to a collimating device which is provided with a first shutter system comprised of an arrangement of shutter elements in the form of an eight-sided thimble or cone, the small end of which extends into the port of the X-ray tube housing and terminates closely adjacent the window back of which the X-ray-generating tube is located. The shutter elements are adjustable and are pivotally mounted at the ends corresponding to the larger end of the thimble and upon adjustment are moved into varying overlying relation with one another so as to regulate the aperture defined by the ends of the shutter elements at the smaller end of the cone.

Further regulation or control of the cross-sectional shape and size of the beam of X-radiation is obtained by two pairs of shutter elements which are disposed in the device between the thimble shutter and the subject and shape the beam to a rectangular configuration, one pair being adjustable to control the size in one direction and the other pair controlling the size in the opposite direction.

It is important, however, that the rectangular cross-sectional size of the beam be carefully controlled so that the beam will not irradiate areas of the subject which are not necessary in connection with the examination or treatment. For example, an X-ray sensitive film may be positioned beneath or at one side of the subject and the X-ray beam made to pass through the subject to expose the film. It is highly desirable that the cross-sectional size of the X-ray beam reaching the film be no larger than the area of the film, since this would indicate that the subject is unnecessarily exposed to X-radiation in the marginal portions of the beam.

Collimators have been made which comprise the two pairs of planar shutter elements for forming a rectangular-shaped beam. One thereof is shown and described in U.S. Pat. No. 3,304,427 issued to the same inventor and assigned to the same assignee as the present invention. It has proven highly desirable to combine the thimble shutter with planar shutters in a single device. However, it has been found difficult to control the thimble shutter independently of the planar shutters without either interfering with the size and shape of the X-ray beam as controlled by the planar shutters or opening the thimble shutter to a larger than necessary extent and therefore possibly allowing escape of undesired radiation.

SUMMARY OF THE INVENTION

The above and other disadvantages of the prior art have been overcome in the present invention by the provision of a collimator having a thimble shutter and a pair of individually operable planar shutter devices, with the planar shutter devices each being separately connected with the thimble shutter whereby the thimble shutter is adjusted simultaneously with adjustment of either of the planar shutter devices. The connection of the planar shutter devices with the thimble shutter includes a novel whiffletree linkage which constantly controls the adjustment of the thimble shutter so that the X-ray beam will never be intercepted to such an extent by the thimble shutter as will reduce the cross-sectional size of the beam to an area which is less than the area of exposure permitted by the planar shutter devices. In other words the irradiation area will always be of a size controlled by the planar shutter devices and will never be reduced by the thimble shutter.

Further, the whiffletree linkage causes the thimble shutter to be closed proportional to closure of either of the planar shutter devices, and the largest diameter of the irradiation area produced by the thimble shutter will always be maintained only slightly greater than the diagonal measurement of the irradiation area produced by the planar shutter devices.

From the above, and from the hereinafter provided detailed description it will be apparent that a novel collimator is provided which will produce a controlled irradiation area size, such as a film size, for example, and will simultaneously exclude from the beam undesired peripheral and accidentally leaked radiation.

BRIEF DESCRIPTION OF THE DRAWINGS

The above and other objectives of this invention will become apparent from the following description taken in connection with the accompanying drawings, wherein.

DESCRIPTION OF THE PREFERRED EMBODIMENT

Figure 1:
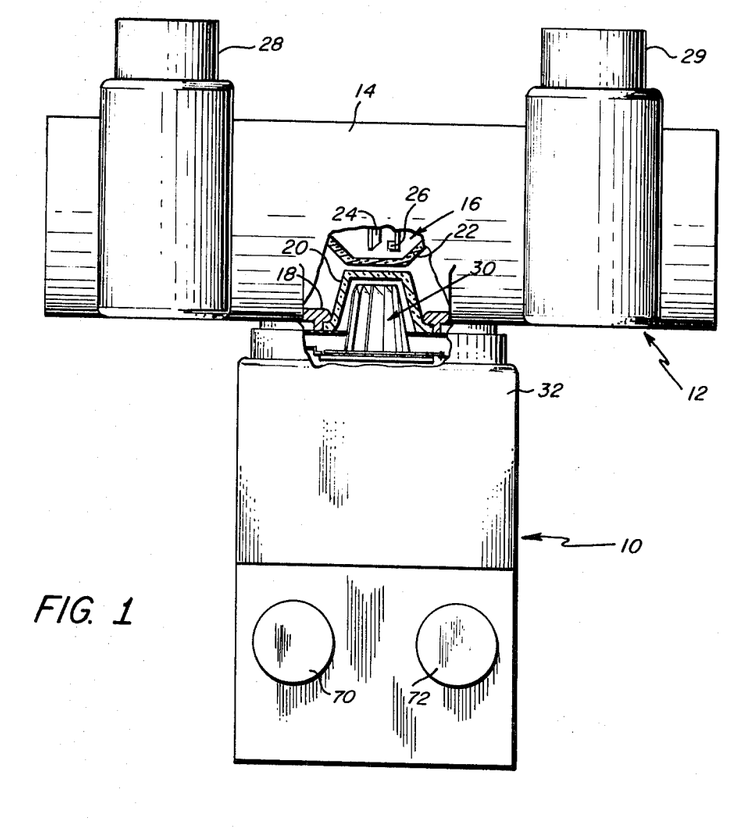
FIG. 1 is a front elevational view, partly in section, of X-ray apparatus embodying the invention.

Referring more particularly to the drawings, wherein like characters of reference designate like parts throughout the several views, there is shown in FIG. 1 a collimator device 10 embodying the invention which is mounted upon an X-ray generator 12. The X-ray generator 12 includes a hollow cylindrical housing 14 containing an X-ray tube or generator 16 therein, the housing 14 being normally filled with oil or other coolant (not shown) for the purpose of maintaining the interior of the housing and the tube or insert 16 at sufficiently low operating temperature. A port 18 is provided in one wall of the housing 14 and contains therein a recessed window 20 of X-ray transparent material. The window 20 is cup shaped and extends into the interior of the housing into close proximity with the X-ray tube insert 16, terminating relatively close to the tube envelope 22 adjacent the X-ray-emitting portion of an anode 24 within the insert 16. Adjacent the anode 24 is an electron-emitting cathode 26. Electrical potentials are supplied to the anode and cathode through internal leads (not shown) which are connected to cable terminals 28 and 29 extending from the housing 14, as is well known in such devices. Additional details of the conventional X-ray generating device 12 are believed to be unnecessary.

In the operation of the device, electrons emitted by the cathode 26 are directed upon an inclined surface of the anode 24, which anode may be of the rotating type to reduce localization of heat by electron bombardment. The electrons from the cathode 26 are focused in a conventional manner onto a relatively small focal spot on the anode 24, which focal spot generates X-ray which pass off the surface of the anode in substantially all directions. The useful X-rays pass from the focal spot on the anode through the X-ray transparent bulb or envelope 22 and through the window 24 exteriorly of the X-ray device 12.

It will be apparent that a substantial amount of X-rays will impinge upon the inner walls of the housing 14 and, therefore, in many cases the walls are lined with lead or other material which absorbs such unuseful X-radiation. In the operation of a device of this type, the useful beam will be directed from the focal spot out through the window 20. However, it has been found that a small amount of off-focus radiation exists. This off-focus radiation is undesirable and should not be allowed to escape from the tube since it does not contribute to the efficient operation of the device. Therefore, in accordance with the present invention, means is provided for preventing substantial amounts of such off-focus radiation from passing exteriorly of the device. This means takes the form of a pyramidal or thimble shutter 30 which is mounted within the upper end of a housing 32 of the collimator device 10, and extends outwardly from the end of the housing into the recessed window 20 and terminates close to the inner end of the window so as to intercept off-focus radiation as closely as possible to the source thereof. Throughout this description the term "upper" is used to denote the end of the collimator nearest the X-ray device, and the term "lower" is intended to refer to the opposite end of the structure. However, it is to be understood that the described system may be inverted or inclined for specific use, such as in "understandable" apparatus, for example, in which case the end of the collimator nearest the X-ray device obviously becomes the "lower" end and the opposite end becomes the "upper" end regardless of the usage of these terms herein.

The housing 32 is mounted upon the X-ray tube housing 14 by any suitable means whereby an opening in the adjacent end thereof is axially aligned with the par 18 and window 20. As will be seen more clearly in FIGS. 2–5, the shutter device 30 comprises a number of shutter elements or leaves 34 which are arranged to extend longitudinally of the axis of the device 10 in a substantially pyramidal or frustoconical arrangement as shown, the small end of the thimble thus formed being disposed exteriorly of the housing 32 and the larger end being located within the housing 32. The leaves 34 are formed as substantially flat elongated platelike elements the planes of which are disposed at a slight angle with respect to the longitudinal axes of the device so that the leaves 34 slightly overlap one another.

Figure 5:
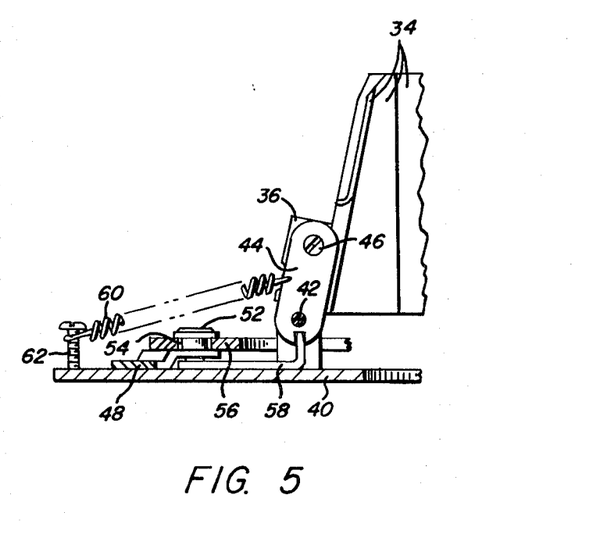
FIG. 5 is an enlarged side elevational view, partly in section, of one of the thimble shutter adjusting devices.

The ends of the elements at the large end of the thimble carry angled radial directed members 36 (FIG. 5) which are pivotally mounted at their lower extremities by a pin 42 to and between respective pairs of lugs 38 extending upwardly from a centrally apertured supporting plate 40, only one of the lugs 38 being shown in FIG. 5 for clarity. The shutter leaves 34 and members 36 are formed of lead which is an efficient X-ray absorber. However, lead is a soft material which easily erodes. Therefore, a small plate 44 is positioned against each side surface of each member 36 and held thereagainst at the lower end by the pin 42 at the upper end by a screw or bolt 46.

The shutter elements are adapted to be pivoted so as to move the upper ends thereof in a manner which will vary the size of the aperture at the upper end of the shutter. In order to achieve this, supporting plate 40 is provided on its upper surface with arms 48, one arm for each shutter element 34. One end of each arm 48 is pivoted as at 50 to the plate 40 and the other end carries a roller 52 which rides within a respective slot 54 provided therefore in a ring 56 to be described. The end of the arm 48 which carries roller 52 is raised above the supporting plate 40 so that the lower end of the roller 52 may be attached to one end of a slidable operating member 58, the opposite end of which is angled upwardly, as shown in FIG. 5, and engages within notches formed in the lower ends of plates 44.

In the operation of the device, whenever, the arms 48 and rollers 52 thereon are swung slightly about pivot pins 50, this will cause sliding movement of the members 58 which will consequently cause the plates 44, members 36 and shutter elements 34 to pivot about pins 42. Each shutter element is yieldably retained in adjusted position by a spring 60 one end of which is fixed to supporting plate 40 as by screw 62 and the other end of which is connected to one of the plates 44 at a point above pivot pin 42.

In order to move the rollers 52 when effecting adjustment of the shutter elements, the sides of the slots 54 are cam surfaces; that is, the slots are slightly arcuate about a point which is offset slightly from the center of the shutter device. Therefore, when the ring 56 is rotated in a plane about its center, the cam-shaped sides of the slots 54 will urge the respective rollers toward or away from the respective shutter elements, thus consequently sliding member 58 and rotating the plates 44, members 36 and shutter elements about pins 42 inwardly or outwardly, depending upon the direction of rotation of the ring. This effects opening and closing of the aperture in the thimble shutter 30 to an extent which is determined by the extent of movement of the ring 56.

Figure 2:
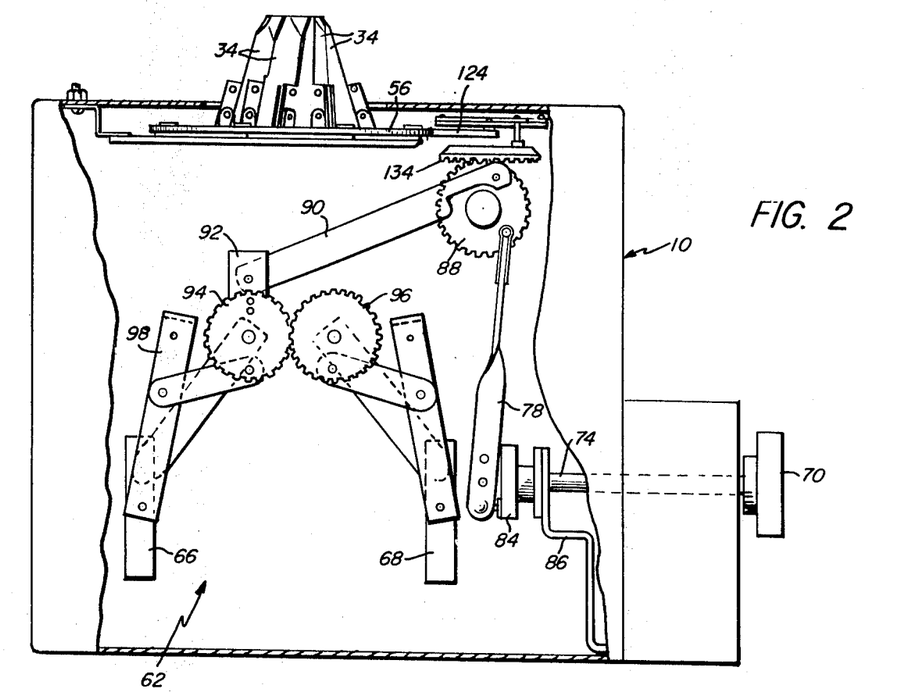
FIG. 2 is a side elevational view of the collimator device with a portion of one sidewall removed to illustrate one of the plane shutter devices.
Figure 3:
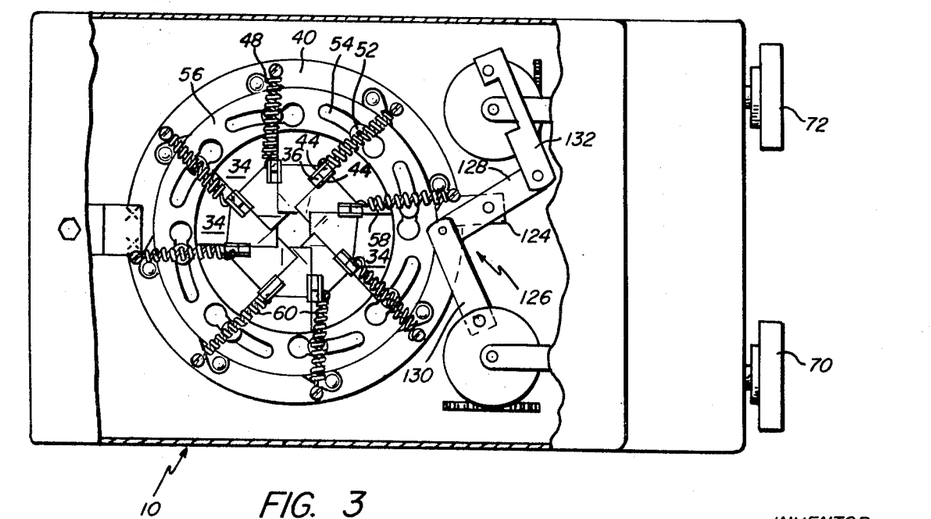
FIG. 3 is a top elevational view of the device shown in FIG. 2 with a portion of the top of the housing removed.
Figure 4:
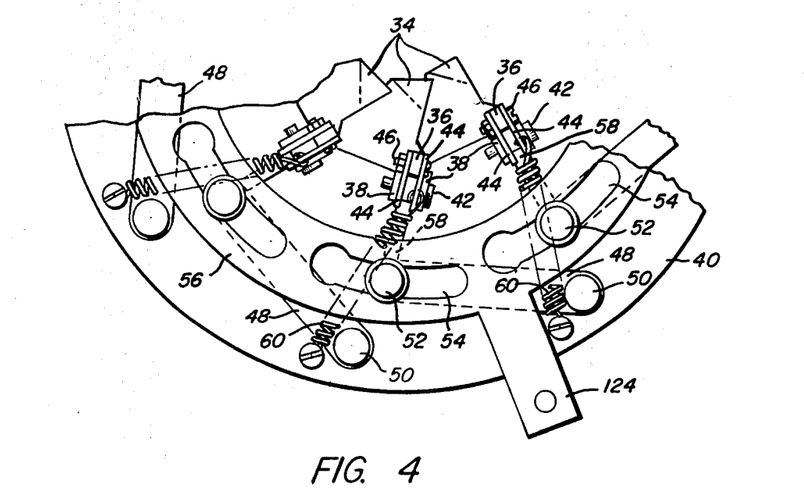
FIG. 4 is an enlarged fragmentary plan view of the thimble shutter.
Figure 6:
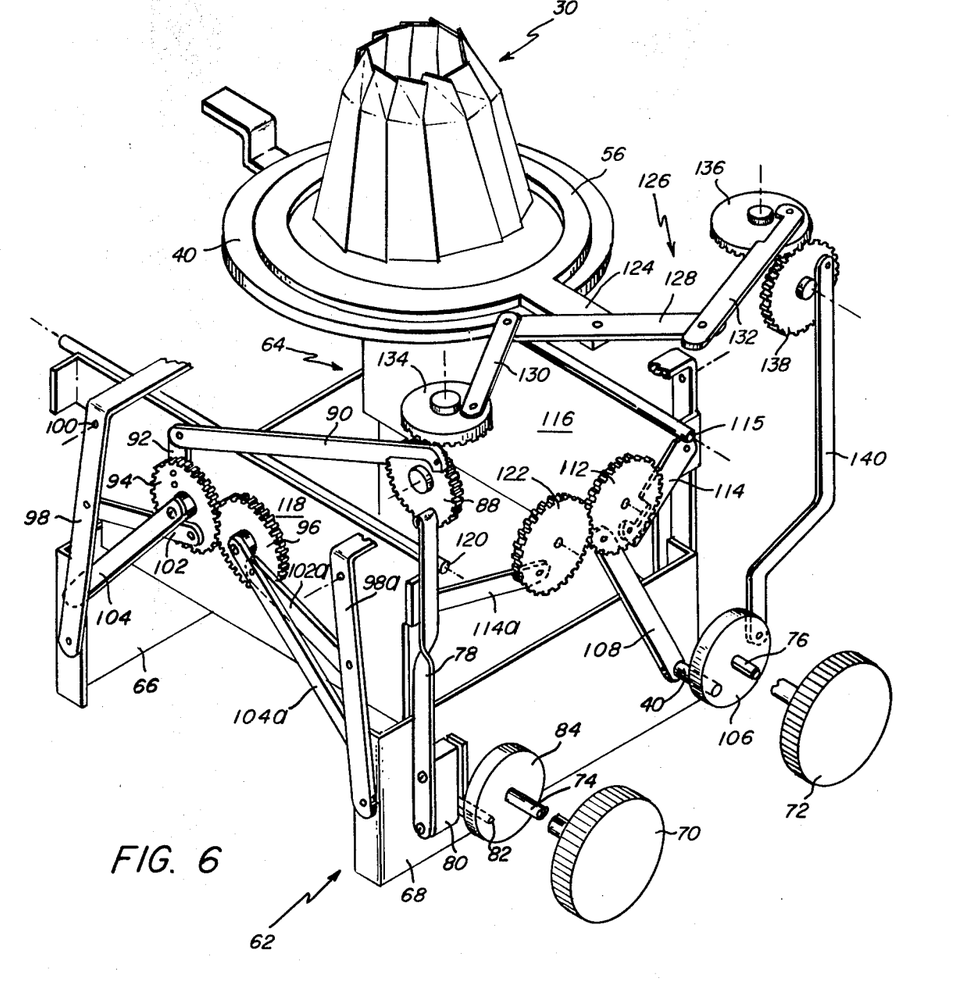
FIG. 6 is a diagrammatic illustration of the three shutter devices of the invention and their interconnecting mechanisms.
Figure 7:
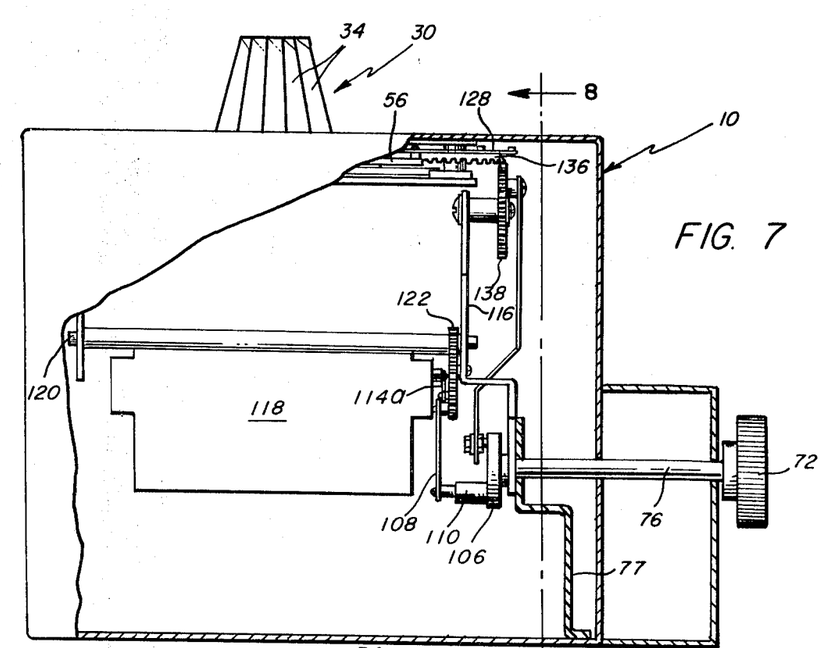
FIG. 7 is a sectional view taken in a vertical plane longitudinally through the collimator illustrating in elevation the second plane shutter device.

Within housing 10 below the thimble shutter 30 are two pairs of plane shutter devices one of which mechanical shall refer to as "cross" shutters 62 and the other as "long" shutters 64. Each pair of shutter devices 62–64 is adapted to limit the cross-sectional size in one dimension of a beam of X-radiation which passes downwardly through the collimator after passing through the thimble shutter 30. The cross shutter device 62 comprises a pair of planar shutter elements 66 and 68 (FIGS. 2 and 6). Shutter elements 66 and 68 may be adjusted relative to one another so that they will each individually intercept opposed marginal portions of the X-ray beam and thus control the dimension of the rectangular beam in one direction. Suitable mechanism to be described is utilized for moving the shutter elements simultaneously by swinging them about respective axes from the open positions shown in FIG. 6 to a closed position where the lower ends of shutter elements abut one another to completely intercept the beam. Operation of the plane shutter devices may be by any suitable mechanical or electrical means. Mechanical means operated by manually rotatable knobs 70 and 72 are disclosed herein, which knobs are positioned on the outer ends of respective shafts 74 and 76 which extend through the front of the housing 10. Electrical means may be provided if desired for causing automatic rotation of shafts 74 and 76 in response to electrical signals if desired.

To operate shutter device 62, knob 70 and shaft 74 are rotated. A vertically extending arm 78 carries a connector 80 at its lower end which supports one end of a pin 82 carried eccentrically by a disc 84 which is mounted on and rotatable with shaft 74. The shaft 74 is rotatably supported near its inner end on a bracket 86 (FIG. 2) attached to the housing 10. When the knob 70, shaft 74 and disc 84 are rotated in a clockwise direction, this will cause pin 82 to move the block 80 and arm 78 upwardly. The upper end of arm 78 is eccentrically pivoted to a first gearwheel 88 which is disposed in a vertical plane and fixedly mounted in the housing in a vertical plane for rotation in response to upward and downward movement of the arm 78.

The resultant rotation of gearwheel 88 causes lateral movement of another arm 90 which has one end eccentrically pivotally connected to wheel 88. The other end of arm 90 is pivotally connected to a plate 92 fixed eccentrically to one of a pair of gear wheels 94 and 96 as shown which are suitably mounted on a frame (not shown) within the housing. Such movement of arm 90 will thus rotate gearwheel 94. Plane shutter 66 is adapted to be moved when gearwheel 94 rotates and is pivotally suspended upon the lower end of one arm of an inverted U-shaped bracket 98 which is pivoted to the housing 10 as at 100. Arm 98 is pivotally connected to one end of a link 102 which is in turn pivotally connected eccentrically to gear wheel 94. Thus when wheel 94 rotates, link 102 will, through bracket 98, cause the shutter element 66 to swing inwardly. It is desired that when it swings inwardly in this manner, the lower edge of shutter element should also swing upwardly to meet the adjacent lower edge of shutter element 68. This is accomplished by another link 104 one end of which is mounted to the center of gearwheel 94 and the other end being pivoted to shutter element 66 above the connection with bracket 98. Thus, when the element is swung inwardly, its upper end is restrained somewhat by link 104, causing the upper edge of the element to move outwardly with respect to the lower edge.

It will be understood that shutter element 68 is moved simultaneously with shutter element 66. Gearwheel 96 is maintained in mesh with gearwheel 94 and therefore rotates with it but in a counterclockwise direction. A bracket 98a and links 102a and 104a connect shutter element 68 to gear wheel 96 similar to the manner in which their counterparts interconnect shutter element 66 with gearwheel 94.

Thus, shutter elements 66 and 68 are adapted to be moved toward and away from one another upon initial rotation of knob 70 and shaft 74 and the spacing therebetween will be governed by the extent of such rotation. Such spacing will also produce the desired cross-sectional size of the X-ray beam in one direction.

Figure 8:
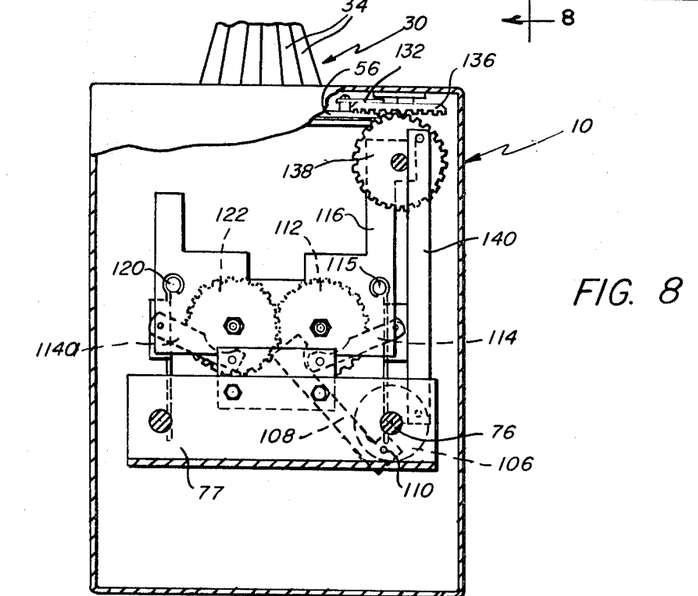
FIG. 8 is a vertical sectional view taken substantially on line 8—8 of FIG. 7.

To regulate the cross-sectional size of the beam in the opposite direction, knob 72 and shaft 76 are rotated to cause rotation of a disc 106 to which one end of an arm 108 is eccentrically connected as by a pin 110. Shaft 76 is rotatably mounted in a bracket 77. Arm 108 is eccentrically connected to a gearwheel 112 which is pivotally connected by a link 114 to a long shutter element 116. Thus, when knob 72, shaft 76 and gear wheel 112 are rotated, this will cause shutter element 116 to swing inwardly about the axis of a pintle 115 by which it is supported upon a frame 116 (FIG. 8) which is bolted upon the upper end of bracket 77.

The second long shutter element 118 is similarly mounted upon a pintle 120 for swinging movement toward and simultaneously with element 116 by means of a second gear wheel 122 which meshes with wheel 112 and is connected to the shutter element 118 by an eccentrically driven link 114a. Thus, the long shutter elements may be adjusted by controlled movement of knob 72 and shaft 76 to control the cross-sectional size of the X-ray beam in the direction opposite that controlled by cross shutter elements 66 and 68.

In accordance with this invention, the thimble shutter 30 is operated simultaneously with operation of either or both of the cross and long shutter devices. To achieve this, the ring 56 of the thimble shutter is provided with a radially extending lever arm 124 to which a whiffletree mechanism 126 is connected. The whiffletree mechanism 126 includes a whiffletree or arm 128 which is pivotally mounted at its midpoint to lever arm 124 and at its opposite ends is connected to one end of respective links 130 and 132. Link 130 is pivoted eccentrically to a horizontally disposed gearwheel 134 which is in mesh with gearwheel 88 so that when gear wheel 88 is rotated by operation of knob 70 this will produce simultaneous rotation of gearwheel 134. As a result, movement of link 130 and arm 128 will move the ring 54, through lever arm 124.

The link 132 is connected eccentrically to a horizontally disposed gearwheel 136 which is in mesh with a vertically disposed gearwheel 138 to which is eccentrically connected one end of vertically extending arm 140. The lower end of arm 140 is eccentrically connected to disc 106 at a point diametrically opposite pivot 110. Therefore, when knob 72 and shaft 76 are rotated, consequent rotation of disc 106 will, through movement of shaft 140, cause rotation of meshed gears 138 and 136, and thus through movement of link 132 and arm 128 will move lever arm 124 and, consequently, ring 56.

Since the movement of ring 56 about its axis will open or close the thimble shutter, it will be apparent that the thimble shutter 30 will thus be adjusted upon operation of either or both knobs 70 and 72. The dimensions of the whiffletree mechanism and of the shutter elements are such, however, although the thimble shutter 30 may be operated toward closed position, at no time will it be closed to such an extent that the X-ray beam passing through it will be intercepted and reduced to a size less than the diagonal of the rectangle formed by the long and cross shutter devices. However, the thimble shutter will always be adjusted to intercept the maximum amount of marginal radiation which might otherwise escape from the system.

From the foregoing it will be apparent that all of the objectives of this invention have been achieved by the structures shown and described. It will also be apparent, however, that various modifications in the structures shown and described and in the methods of their operation may be made by those skilled in the art without departing from the spirit of the invention as expressed in the accompanying claims. Therefore, all matter shown and described is to be interpreted as illustrative and not in a limiting sense.

I claim:

1. A radiation collimator comprising a casing, a thimble shutter at one end of the casing having a plurality of leaves of radiation absorbing material extending out through the casing, a ring encircling said leaves and operatively connected to each individual leaf for moving the leaves to effectively define a hollow cone, with the extent of movement of the ring determining the size of an aperture defined by the outer ends of the leaves whereby a beam of radiation directed into the casing will be intercepted and absorbed by said leaves except for the portion thereof which passes through the aperture, a first pair of plane shutters within the casing, first operating means for adjusting the spacing between the plane shutters so that the shutters will intercept opposed marginal portions of the beam passing therethrough from said thimble shutter, a second pair of plane shutters within the casing disposed respectively at the two sides of the beam not intercepted by the first plane shutters, second operating means for adjusting the spacing between the second plane shutters so that they will intercept opposed marginal portions of the beam passing therethrough from the thimble shutter and together with the first plane shutters providing the beam with a rectangular cross-sectional shape of desired size, connecting means including a whiffletree linkage between said first and second operating means and said ring for causing movement of the ring and consequent adjustment of the thimble shutter simultaneously with operation of both of said operating means to an extent where the thimble shutter will intercept radiation entering the casing from off-focus sources without intercepting radiation which contributes to the portion of the beam which is permitted to pass through said plane shutters in their adjusted positions.

2. A radiation collimator as set forth in claim 1 wherein said connecting means comprises two separate devices connected between the respective first and second operating means and the ring by said whiffletree linkage whereby individual operation of either operating means will move the ring and cause adjustment of the thimble shutter simultaneously therewith.

3. A radiation collimator as set forth in claim 2 wherein said connecting means and whiffletree linkage are so dimensioned as to constantly retain the adjusted aperture size of the thimble shutter at a value such that the diameter of the beam passing into the plane shutters will always be not less than the diagonal size of the rectangular beam formed by the plane shutters.

4. A radiation collimator comprising a casing having openings at opposite ends for passing a radiation beam therethrough from an external source, a thimble shutter at one end of the casing extending through the opening therein toward said source and adapted to pass said beam therethrough, a first pair of plane shutters within the casing for intercepting opposed marginal portions of said beam, a second pair of plane shutters within the casing disposed at the opposed sides of the beam which are intercepted by the first plane shutters for intercepting said opposed sides of operating means connected to said first and second pairs of plane shutters for effecting simultaneous operation thereof to provide the beam with a controlled rectangular size and shape, and connecting means connecting said operating means to said thimble shutter for operation thereof simultaneous with operation of both of said pair of plane shutters and for intercepting radiation entering the casing from off-focus sources without intercepting radiation which contributes to the portion of the beam which is permitted to pass through said plane shutters in their adjusted positions, said connecting means including whiffletree linkage means for adjusting the thimble shutter to an extent where the thimble shutter will intercept radiation entering the casing from off-focus sources without intercepting radiation which contributes to the portion of the beam which is permitted to pass through said plane shutters in their adjusted positions:

UNITED STATES PATENT OFFICE
CERTIFICATE OF CORRECTION

Patent No. 3,609,370                    Dated September 28, 1971

Inventor(s) Leonard F. Peyser

It is certified that error appears in the above-identified patent and that said Letters Patent are hereby corrected as shown below:

Column 2, line 12, delete "cases" and insert -- causes --

Column 3, line 35, delete " "understandable" " and insert -- "undertable" --

Column 3, line 42, delete "par" and insert -- port --

Column 3, line 64, after "42" insert -- and --

Column 4, line 31, delete "mechanical" and insert -- we --

Column 4, line 46, after "beam." start a new paragraph

Column 5, line 14, after "the" insert -- shutter --

Column 7, line 6, after "of" insert -- the beam --

Signed and sealed this 2nd day of May 1972.

(SEAL)
Attest:

EDWARD M. FLETCHER, JR.          ROBERT GOTTSCHALK
Attesting Officer                Commissioner of Patents